United States Patent
Thrapp et al.

(10) Patent No.: US 9,972,029 B2
(45) Date of Patent: May 15, 2018

(54) USE OF PERSONALIZED POINTS OF REFERENCE IN SELECTING ADVERTISEMENTS SHOWN TO USERS

(75) Inventors: Haley Thrapp, Champaign, IL (US); Scott E. Preece, Champaign, IL (US)

(73) Assignee: EXCALIBUR IP, LLC, New York, NY (US)

( * ) Notice: Subject to any disclaimer, the term of this patent is extended or adjusted under 35 U.S.C. 154(b) by 1023 days.

(21) Appl. No.: 12/971,472

(22) Filed: Dec. 17, 2010

(65) Prior Publication Data
US 2012/0158507 A1    Jun. 21, 2012

(51) Int. Cl.
*G06Q 30/00* (2012.01)
*G06Q 30/02* (2012.01)

(52) U.S. Cl.
CPC ................. *G06Q 30/0256* (2013.01)

(58) Field of Classification Search
USPC ........................................................... 705/14
See application file for complete search history.

(56) References Cited

U.S. PATENT DOCUMENTS

| 2002/0077084 A1* | 6/2002 | Zellner .............. G06Q 30/0207 455/414.2 |
| 2011/0004511 A1* | 1/2011 | Reich .......................... 705/14.1 |
| 2012/0066065 A1* | 3/2012 | Switzer ...................... 705/14.53 |
| 2012/0066067 A1* | 3/2012 | Curtis ................ G06Q 30/0251 705/14.58 |
| 2012/0095844 A1* | 4/2012 | Barnes, Jr. ................. 705/14.69 |
| 2012/0310736 A1* | 12/2012 | Vengroff et al. ........... 705/14.53 |

OTHER PUBLICATIONS http://www.upinpoint.com/build-maps.jsp.*

* cited by examiner

*Primary Examiner* — Alvin L Brown
(74) *Attorney, Agent, or Firm* — James J. DeCarlo; Greenberg Traurig, LLP

(57) ABSTRACT

Disclosed is a method and system for selecting targeted advertisements based on a user's personal points of reference. The personal points of reference identify user specific locations of interest based at least on geographic locations. In order to determine which advertisements are relevant to a user's personal point of reference, the advertisements served by an advertising server contain metadata appended therein. The ad metadata is correlated with locations, and provides geographical sensitivity to specific locations. Thus, advertisements are matched to points of reference based on geo-location data. When the advertising server is presented with a user's personal point of reference, the ad server compiles the point of reference's geo-location data against the ad metadata, and determines if there is a match. Upon a match being identified, the advertisement associated with the ad metadata is served to the user.

19 Claims, 8 Drawing Sheets

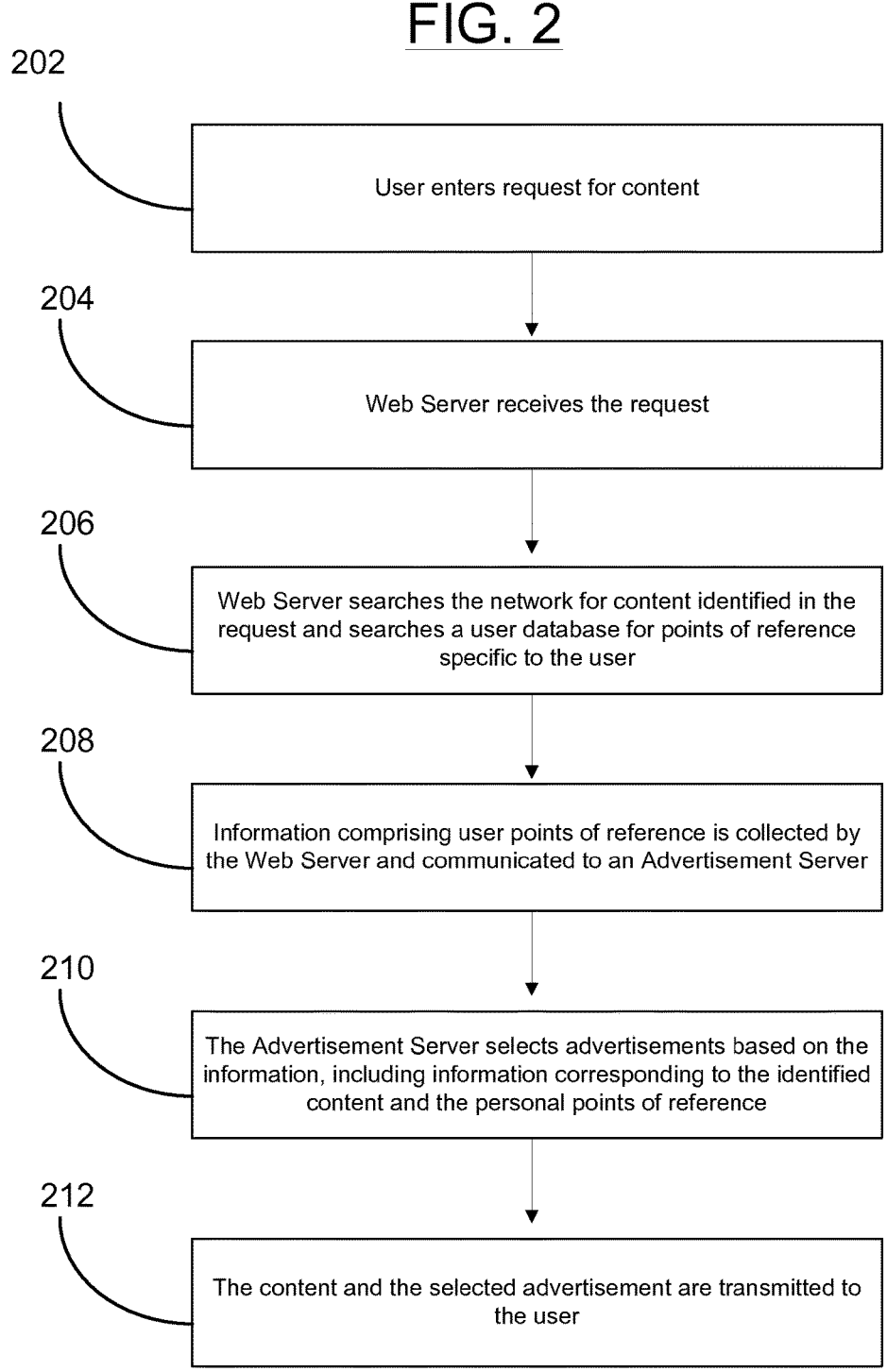

U.S. 9,972,029 B2

USE OF PERSONALIZED POINTS OF REFERENCE IN SELECTING ADVERTISEMENTS SHOWN TO USERS

FIELD

The present disclosure relates to selecting advertisements, and more specifically to a method and system for utilizing users' personal points of reference to select targeted advertisements.

RELATED ART

Advertising through use of the Internet and the World Wide Web has become increasingly popular as a way to promote products and services to consumers. Use of the Internet to advertise products and services often takes the form of banner advertisements, pop-up advertisements, interstitials, frame advertisements, and the like.

SUMMARY

The present disclosure describes an ad-serving engine that takes advantage of multiple locations that the user has expressed interest in. Such locations are identified as personal points of reference specific to a user. When serving an advertisement to a user, the ad-serving engine accounts for the user's personal points of reference, and serves an advertisement that is contextually relevant to the user's expressed interests. Thus, rather than a content provider or advertiser having to guess at which ads might be most relevant, the user dictates what type of ads he or she would like to receive based upon the user's identified points of reference.

In an embodiment, a method is disclosed for serving targeted advertisements based on points of reference. The method receives, at a server computer, a search request by a user for content. The content requested is identified on the network based upon the search request. The method searches and selects from a user database a user defined personal point of reference. The personal point of reference corresponds to a geographic location. The method then searches an advertisement database for an advertisement based upon the personal point of reference. An advertisement is identified that includes content that is relevant to the geographic location identified by the personal point of reference. The method facilitates serving the selected advertisement with said content to said user.

In another embodiment, a computer-readable storage medium is disclosed for serving advertisements based on the points of reference.

In yet another embodiment, a system of an ad serving engine is disclosed for serving targeted advertisements. The system, which includes a plurality of processors, comprises a request retrieval module, implemented by one of said plurality of processors, configured to receive a request for a content page from a user. A content page retrieval module, implemented by one of said plurality of processors, is configured to perform a search for the requested content page. A point of reference retrieval module, implemented by one of said plurality of processors, is configured to search a user database for personal points of reference associated with the user and select at least one point of reference based upon user designations. The user database is associated with a computer-readable storage medium. An ad retrieval module, implemented by one of said plurality of processors, is configured to compile the content page retrieved by the content page retrieval module and the personal point of reference identified by the point of reference retrieval module. An ad selection module, implemented by one of said plurality of processors, is configured to search for and select at least one advertisement that correlates with the user's personal point of reference, whereby the selection is additionally based upon specifications defined by the retrieved content page. The ad serving engine is configured to facilitate presentation of the selected advertisement with the retrieved content page to a user.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 2 is a flowchart illustrating steps performed in accordance with an embodiment of the present disclosure;

DESCRIPTION OF EMBODIMENTS

Figure 1:
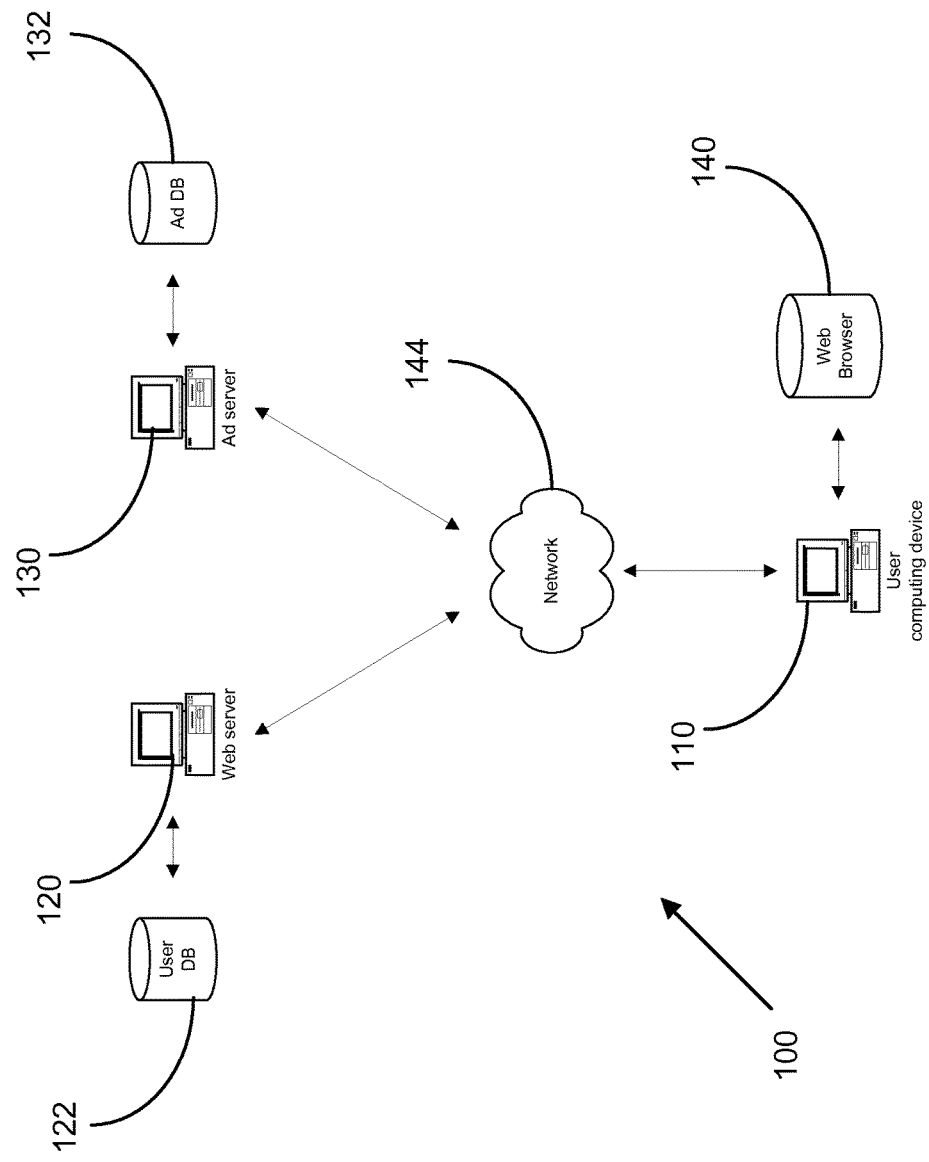
FIG. 1 is a block diagram of a user computing device communicating with a web server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present advertisements related to specific spatial locations. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

The principles described herein may be embodied in many different forms. The described systems and methods allow advertisements to be provided or served via a network, such as the Internet. Advertisements can be search related, banner ads or display ads, in static or media rich formats. In some embodiments, advertisement content may be personalized based on user defined personal points of reference.

Personal points of reference are locations of interest that a user has pre-defined. The personal points of reference can include locations for which the user has expressed interest, such as, for example, locations where the user vacations, owns property, has family, etc. The locations can be pre-defined by the user, or input in real-time during a search request.

The personal points of reference are stored as part of a user profile associated with the user. In exemplary embodiments, each personal point of reference includes geographic coordinates that correspond to entities, such as place names, businesses, street address or other entities associated with a specific physical location. The points of reference comprise geo-coded location information for each point of reference. Geo-coding provides associated geographic coordinates of locations, such as latitude and longitude, or other geographic data, such as street addresses, or zip codes (postal codes). With geographic coordinates, the features can be mapped and entered into Geographic Information Systems, or the coordinates can be embedded into media such as digital images, advertisements, video, web pages, or the like. In other embodiments, the personal points of reference stored within the user profile may only contain partial location information. This is beneficial if it is desired to save space within the user profile and lower transmission and retrieval time, as full determination of location information for a personal point of reference can occur during the retrieval of a relevant advertisement. For example, a partial location (e.g., the city) of a personal point of reference could be used to determine whether there is any possible match with an advertisement. Should a possible match be discovered, a more detailed address would then be compiled and utilized in determining the appropriate advertisement. This will be discussed in more detail below.

Advertisements are selected based on the current context (search results or page content) and the user's profile, which includes the user's personal points of reference. The personal points of reference identify user specific and defined locations of interest based at least on geographic locations. As such, in order to determine which advertisements are relevant to a user's personal point of reference, the advertisements served by an advertisement server contain metadata appended therein. The ad metadata is correlated with locations, and provides geographical sensitivity to specific locations. Thus, as discussed below, advertisements are matched to points of reference based on geo-location data. When the advertising server is presented with a user's personal point of reference, the ad server compiles the point of reference's geo-location data against the ad metadata, and determines if there is a match. Upon a match being identified, the advertisement associated with the ad metadata is served to the user.

Certain embodiments will now be described in greater detail with reference to the figures. In general, with reference to FIG. 1, a system 100 in accordance with an embodiment for providing a personalized advertisement is shown. The user can access a Web page from a user computing device 110. The Web page may be provided by web server 120 over network 144. An advertisement may be served to user computing device 110 from advertisement server 130 over the network 144. Each of user computing device 110, web server 120 and advertisement server 130 can be communicatively coupled via the network 144, such as the Internet. Although different steps are being performed by the web server 120 and the advertisement server 130, it should be noted that any one or more of the steps can be performed by either of the web server 130 and the advertisement server 130, or the function can be combined in a single server. In accordance with some embodiments, the ad server 130 and the web server 120 can be a single server or multiple servers, and can be at a single location or multiple locations. Portions of advertisement content and advertising metadata may be stored at advertisement database 132. Advertising content and metadata can be accessed by and served from advertisement server 130 to the user computing device 110 based upon user information, which is stored at user database 122, as is described in further detail below.

User computing device 110 includes a web browser 140, or other program for interfacing with the network. The web server 120 provides Web pages which are accessible by the user computing device 110. One of the Web pages includes reference to the advertisement. Such an advertisement, which may contain portions written in HTML, XML, Macromedia Flash, Java, JavaScript, and the like is served by advertisement server 130, as is generally known in the art.

It is to be understood that the present disclosure may be implemented utilizing any number of computer technologies. For example, although certain embodiments relate to providing access to content via the Internet, the disclosure may be utilized over any computer network, including, for example, a wide area network, local area network or, corporate intranet. Similarly, the user computing device 110 may be any computing device that may be coupled to the network 144, including, for example, personal digital assistants, Web-enabled cellular telephones, devices that dial into the network, mobile computers, personal computers, Internet appliances, wireless communication devices and the like. Furthermore, the servers described herein may be of any type, running any software, and the software modules, objects or plug-ins may be written in any suitable programming language.

Having described the components of the system 100, its general operation will now be described with reference to FIG. 2. First, a user enters a page request for content. Step 202. The request can be generated by the user searching for a content page via a search engine, e.g., yahoo.com. The request may also be generated by the user entering a URI or URL in the address bar of an Internet browser. Additionally, the request can be generated by the user clicking on a hyperlink of a displayed page. In some embodiments, appended to the user request is identifying information that the web server utilizes to identify the user and poll the user database for user-specific content stored within the user database. In some alternative embodiments, the user may login via a login ID provided at a user interface. This enables the user to be properly directed to his/her personal points of reference stored within the user database.

At step 204, the request for the content page is transmitted to a web server. Upon receipt of the request, the web server performs a search for the requested content page, and polls a user database for the user's personal points of reference. Step 206. According to some embodiments, the web server can search the user database along with retrieving the content page within the same iterative process. In certain embodiments, the user database may be searched either before or after the content page has been retrieved. This can be based upon a latency determination that is contingent upon the allocated bandwidth available over the network, and/or the lag between transmission times between the web server polling the user database and retrieving the content page from the network.

At Step 208, the collected points of reference and content page are communicated to an advertisement server. The advertisement server polls an associated advertisement database, and selects an advertisement that correlates with the user's profile information, including personal points of reference. Step 210. The advertisement database contains advertisements and their associated metadata. The ad metadata includes information relating to the type of advertisement, size, dimension, and other display qualities. The ad metadata further includes information corresponding to geographic locations. The advertising server matches the provided personal point of reference's geo-location information against ad metadata geo-location information. Upon a match between the point of reference geo-location information and the ad metadata geo-location information, the advertisement associated with the identified ad metadata is selected. Next, the selected advertisement and the content page are delivered to the user device. Step 212. The content page and the advertisement can be combined for singular viewing on a page prior to delivery to the user, or it can be combined at the user computing device by the device or the web browser.

Figure 3A:
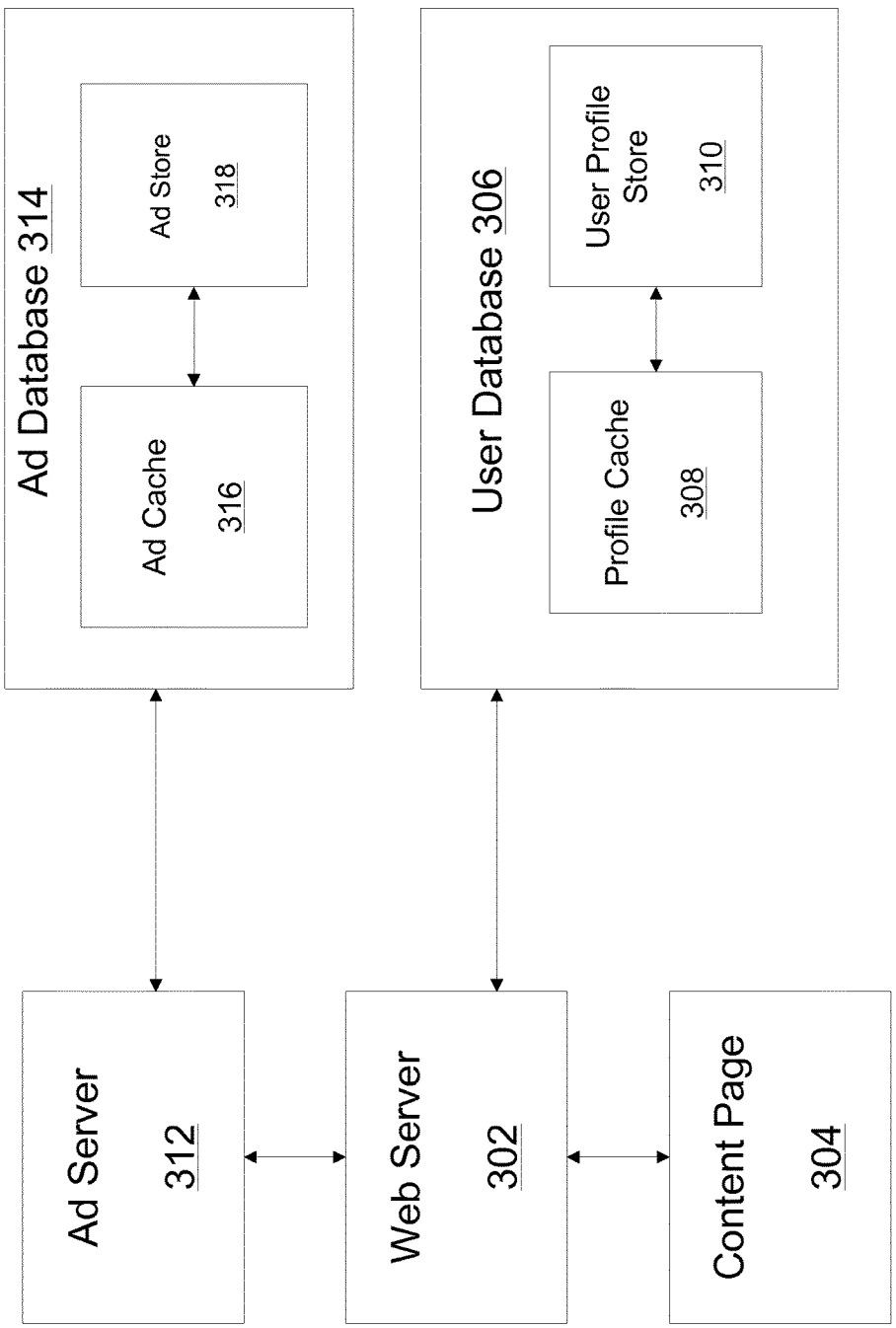
FIG. 3A is a block diagram of a web server communicating with a user database and advertisement server over a network in accordance with an embodiment of the present disclosure.

FIG. 3A is an exemplary system diagram illustrating the entities that the web server 302 interacts with in order to retrieve the content page and the user's personal points of reference, and ultimately serve an advertisement with the content page. The web server 302 is in communication with an advertisement server 312 and a user database 306. The web server 302 performs a search for the content page 304, and searches the user database 306 for the user's personal points of reference. The content page 304 is retrieved over the network. The retrieved content page 304 is contingent upon the user's request, as discussed in step 202 in FIG. 2.

The retrieved content page 304 provides information identifying advertisement availability within the content page. The content page 304 dictates the positioning of potential advertisements placement and display within the page. The content page 304 can further identify the type size, dimension, and other display qualities a potential advertisement must have in order to conform to the page.

The user database 306 provides the requesting web server 302 with a user's profile information, including personal points of reference. As discussed above, personal points of reference are locations of interest to a user. The locations can include a user's home or other locations for which the user has expressed interest. For example, locations where the user vacations, owns property, has family, or even a location that the user would like to research.

The user database 306 comprises a profile cache 308 and a user profile store 310. According to exemplary embodiments, the user profile store 310 houses a user's saved locations. The profile cache 308 houses the geographical location data associated with the locations. Personal points of reference are represented by a location "name", which are stored in a user profile store 310. The corresponding location data is stored in the profile cache 308. For example, if a user's personal point of reference is the Presidential White House, "White House" would be saved in the user profile store 310, and "1600 Pennsylvania Avenue NW Washington, D.C. 20500" would be saved in the profile cache 308. Alternatively, or in conjunction with the address for the White House, the profile cache 308 may also store the GPS location of the White House: latitude 38 degrees 53 minutes and 51.61 seconds north and the longitude 77 degrees 2 minutes and 11.58 seconds west. The saved locations within the user profile store 310 can either take the standard name, or a user can rename a location in order to personalize the location. For example, if a user normally vacations in Miami, Fla., the user may want to denote the location as "Vacation" instead of the leaving a generic location name as "Miami, Fla.".

In accordance with some embodiments, a user's personal points of interest can be arranged according to a priority and/or proximity. Ads may be selected either based on the general location (e.g., same city) or specific proximity to the user's points of reference. The proximity can be set by the user, content provider or advertisement serving entity. Advertisements related to those locations would also have higher value than random advertisements. For example, an advertisement for a restaurant across the street from the user's vacation hotel has higher value than an advertisement for a restaurant on the other side of town. As a result, advertisements contingent upon a user's point of reference would generate a higher click-through rate and higher revenue, as well as a better user experience that will increase engagement and time-on-site.

The disclosed ad-serving engine can match advertisements to those locations that the user has indicated as a top priority. The priority can be allocated as a listing of locations, which serves as a top down list, with the most desirable (or important) location to the user atop the list, and the locations listed below having less desirability to the user. For example, for a user that lives in New York City, works on Wall Street, spends his weekends at Pier 40 kayaking, and vacations twice a year in Cancun, Mexico, his/her personal points of reference may be listed as, in order of priority: Wall Street (for restaurants and shopping during the work week), Pier 40 (as the weekends are spent here), and finally Cancun, Mexico. The user has ability to manage and alter this listing whenever he/she desires. For example, if the user's bi-annual vacation is approaching, the user may move Cancun, Mexico to the top of the priority listing in order to receive advertisements that provide information relevant only to the vacation.

In some embodiments, the user may also denote a proximity to a specific point of reference. From the above example, if the user has listed a personal point of reference as Wall Street, the user can set a proximity to the location spanning a certain distance. For example, if the user is interested in places to eat lunch during the work week, the user can set a half (0.5) mile proximity from Wall Street, so that the user is aware of advertising deals and events for restaurants within that radius.

A priority listing and proximity radius for a point of reference can also be set up to build upon one-another. A user can set up a separate priority listing that is based upon a proximity listing. From the above example, the user can denote certain bars, restaurants, shopping locales, etc. within a certain proximity from his Wall Street point of reference. Thus, supplementing the Wall Street location and half mile proximity radius, the user can have a separate and supplemental listing that identifies his favorite places to visit, shop or eat near and around Wall Street. For example, if Restaurant X, Shopping venue Y, and Clothing Tailor Z are within a half mile radius of Wall Street, and the user has denoted the priority of such locales in order: X, Y, then Z, the user will be able to receive relevant advertisements to those locations, in addition to, or instead of those randomly selected based on the Wall Street location.

According to some embodiments, the geographic location data stored in the profile cache 308 can be whole geo-location points. Such information can include the street address, GPS location and the like. Such information can also include, where applicable, other entities associated with a specific physical location. For example, if a location is a mall, associated entities within the mall would include the stores that reside within the mall confines. As such, a user would have an ability to organize the listing of associated entities in a priority order as discussed above.

In certain embodiments, the profile cache 308 may only retain partial location information for retrieved points of reference. As discussed above, this can save space within the user database 306 and lower transmission and retrieval time of the points of reference. As a result, geo-coding of the remainder of location can be performed during the retrieval of a relevant advertisement. By way of a non-limiting example, a partial location could be a street name. When matching an advertisement to the personal point of reference, if an advertisement's ad metadata correlates with the street name, additional location information would then be determined for the point of reference, thus providing sufficient information to permit the system to make a determination as to whether the advertisement is relevant. For example, upon matching the street name of a point of reference to an ad, the street number for the point of reference is then determined. This can be performed by geo-coding the location identified by the user database 306, or by other means for determining a location's geographical data. If the street number from the point of reference and the ad match, the advertisement is selected. Additionally, in some embodiments, a user's point of reference may only be a street name. Therefore, only the partial location information pertaining to a street name may be necessary to match an advertisement with the point of reference.

In some alternative embodiments, the profile cache 308 can also contain locations that have been retrieved in the past. It is more likely that a location that has been retrieved in the past is of certain particular interest to a user. Thus, the profile cache 308 can house this information in order to expedite retrieval time and decrease latency.

Figure 3B:
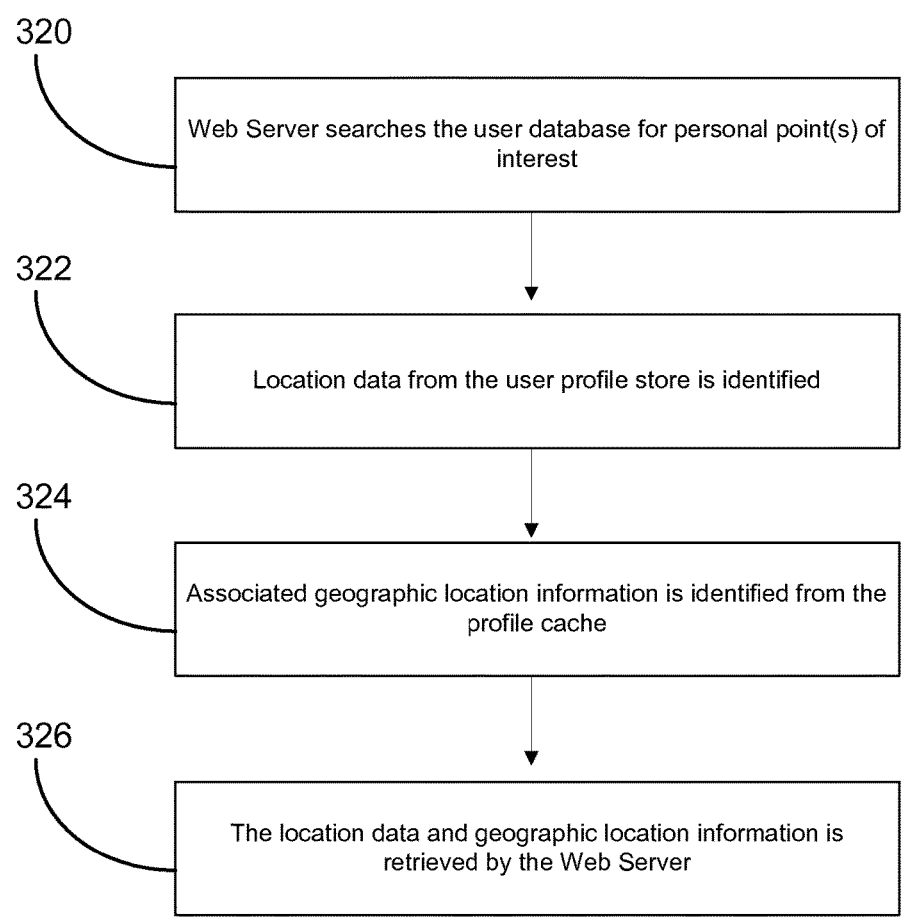
FIG. 3B is a flowchart illustrating steps performed in accordance with an embodiment of the present disclosure.

Building upon the discussion of FIG. 3A, FIG. 3B provides the work flow of how the web server 302 retrieves location and address information from the user database 306. In step 320, the web server 302 requests a personal point of reference from the user database 306. First, the location information is retrieved from the user profile store 310. Step 322. With this information, the profile cache 308 is polled. The location information located in the profile cache 308 is then retrieved. Step 324. The retrieved geographic location information from the profile cache and location information from the user profile store are then returned to the web server 302. Step 326. In some embodiments, the order of how information relating to the personal point of reference is retrieved can be switched. For example, the location information from the profile cache 308 can be retrieved first, and used to identify a location name from the user profile store 310.

Figure 3C:
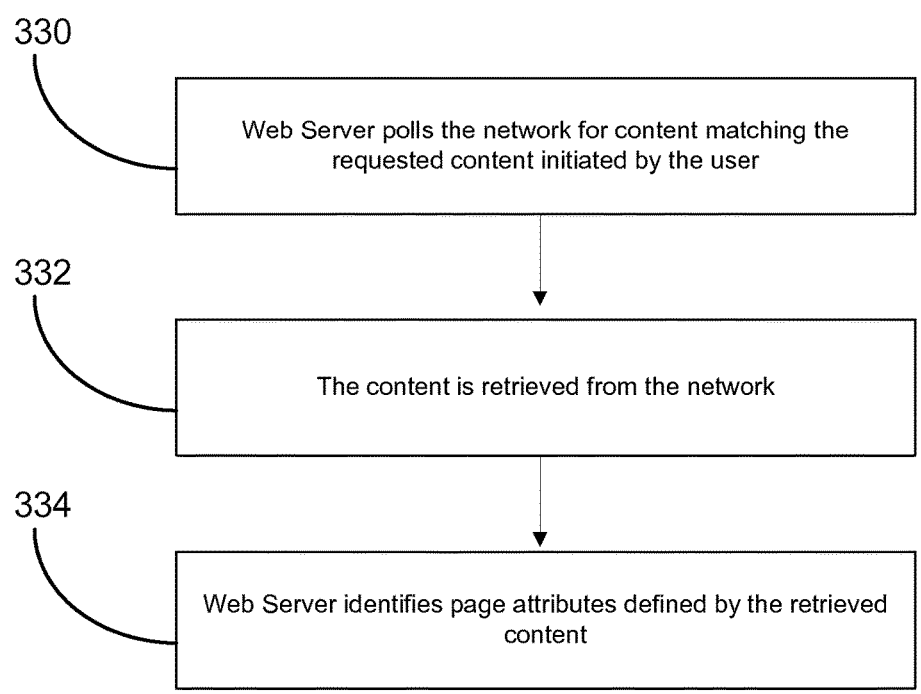
FIG. 3C is a flowchart illustrating steps performed in accordance with an embodiment of the present disclosure.

FIG. 3C illustrates an embodiment of how the content page 304 is retrieved. Based upon the request received from the user computing device 110 (from FIG. 1), the web server polls the network 144, and in some instances remote locations within the network 144, for the requested content page 304. Step 330. After the content page 304 has been retrieved, in Step 332, the content page 304 is then analyzed for page attributes. Step 334. The page attributes can provide a directive as to how any and all potential advertisements will be displayed. The page attributes identify advertisement availability within the content page, and describe where potential advertisements can be displayed within the content page 304. The content page 304 page attributes can further identify the type size, dimension, and other display qualities a potential advertisement must have to fit within the page. According to some embodiments, if a content page 304 has more than one available advertising spot available on the page, the user can denote whether the secondary ads filling the additional spots should relate to the top priority point of reference, subsequent points of reference stored in the user database 306, or locations within a proximity to a point of reference stored in the user database 306. Also, the user can also denote a time period that an ad is displayed, so that all the user's points of reference trigger advertisements being displayed. Such information can also be stored in the user database 306.

As depicted in FIGS. 3A-3C, the web server 302 retrieves the content page 304 and information relating to personal points of reference. After the content page 304 information and the personal points of reference from the user database 306 have been collected, the content page 304 information and the personal points of reference are communicated back to the requesting web server 302. The web server 302 communicates or shares this information with the advertisement server 312 and an advertisement database 314. As illustrated in FIG. 3A, the advertisement database 314, which can be associated with or housed within the advertisement server 312, comprises an advertisement cache 316 and an advertisement store 318. As discussed below, the advertisement cache 316 houses the ad metadata and the advertisement store 318 houses the advertisements which are associated with the ad metadata, respectively.

Figure 4:
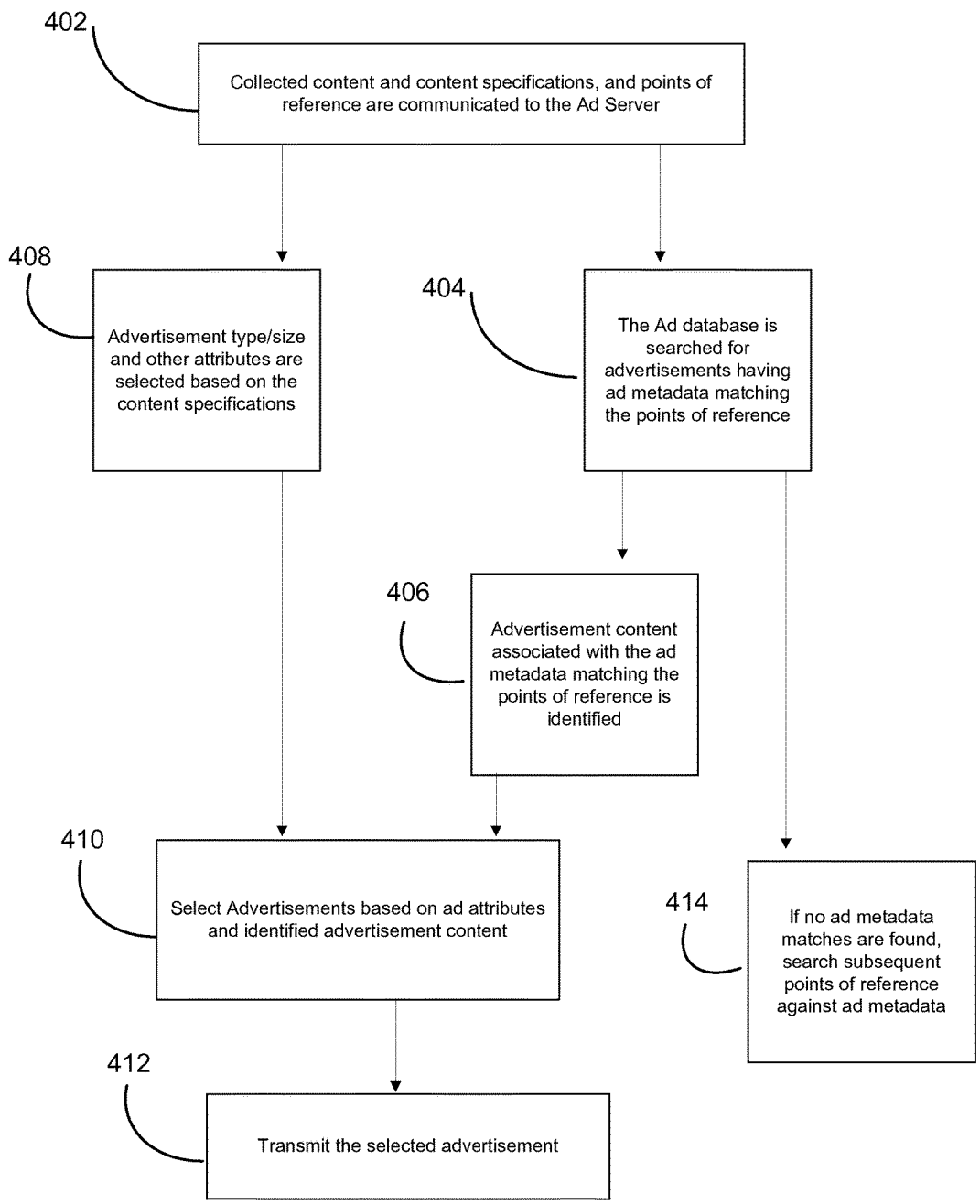
FIG. 4 is a flowchart illustrating steps performed in accordance with an embodiment of the present disclosure.

FIG. 4 depicts a work flow of the web server 302 communicating the collected information relating to the advertisement server 312, and how the information is utilized for selecting a relevant advertisement for the user. In step 402, the collected content page 304 and personal points of reference information are communicated (or shared) from the web server 302 to the advertisement server 312. Upon receipt, the advertisement server 312 performs a search for a relevant advertisement within the advertisement database 314. The search for an advertisement is based at least on the user's personal points of reference and/or information contained within the content page 304.

In Step 404, the advertisement server 312 searches the advertisement database 314 for advertisements that match the user's personal points of reference. The advertisements and advertisement content are searched based upon ad metadata. The ad metadata is correlated with geographic locations, and provides geographical sensitivity to specific locations. Thus, advertisements are matched to points of reference based on the geographic location data comprised within their ad metadata. When the advertisement server 312 receives a user's personal point of reference, the ad server 312 compares the point of reference's geo-location information against the ad metadata's correlated location(s), and determines if there is a match. Upon a match being identified between the location information of the personal point of reference and ad metadata for an advertisement, the advertisement corresponding to the matching ad metadata is identified. Step 406. In some exemplary embodiments, Step 406 entails advertisement content being identified, as the advertisement that will be served to the user will be selected based at least upon the ad content and other attributes, as discussed in Step 408.

From Steps 404-406, if no advertisements or ad metadata match the top priority point of reference, the ad-serving engine then searches the next point of reference on the list. Step 414. If no advertisements match any of the points of reference, the ad-serving engine can provide the nearest relevant advertisement possible to the top priority point of reference.

In Step 408, the collected content page information can be utilized to determine the specifications of the advertisement that will be served to the user. The specifications of the advertisement may have to conform to the specifics dictated by the content page. As discussed above, the content page provides information identifying advertisement availability within the content page. The content page dictates the positioning within the page where potential advertisements can be displayed. The content page can further identify the type size, dimension, and other display qualities a potential advertisement may have to conform to in order to be properly displayed.

According to some embodiments, the advertisement server 312 can determine the specifications of the advertisement (in Step 408) and identify advertisement content (Steps 404-406) in the same iterative process. In certain embodiments, Step 408 may be performed either before, during, after, or any combination of the three in relation to Steps 404-406.

In Step 410, an advertisement is selected (or retrieved) based on the results of Steps 406 and 408. In some embodiments, the advertisement can be selected based upon the result of Step 406, and modified to conform to the results of Step 408. In some embodiments, as in Step 412, the selected advertisement is shared or communicated with the web server. In some alternative embodiments, the selected advertisement is sent directly to the user's computing device. In the embodiments where the advertisement is sent to the web server, the web server can compile the information from the content page and the advertisement, and send a fully built web page containing the selected advertisement to the user's computing device. In the embodiments where the selected advertisement is sent directly to the user's computing device, the web browser that initiated the request, receives the content page and advertisement separately, and in real-time compiles and presents the web page equipped with the advertisement for viewing by the user. Alternative embodiments also exist where the content page and advertisement are sent to the web server and compiled into one built page by the web browser.

Figure 5:
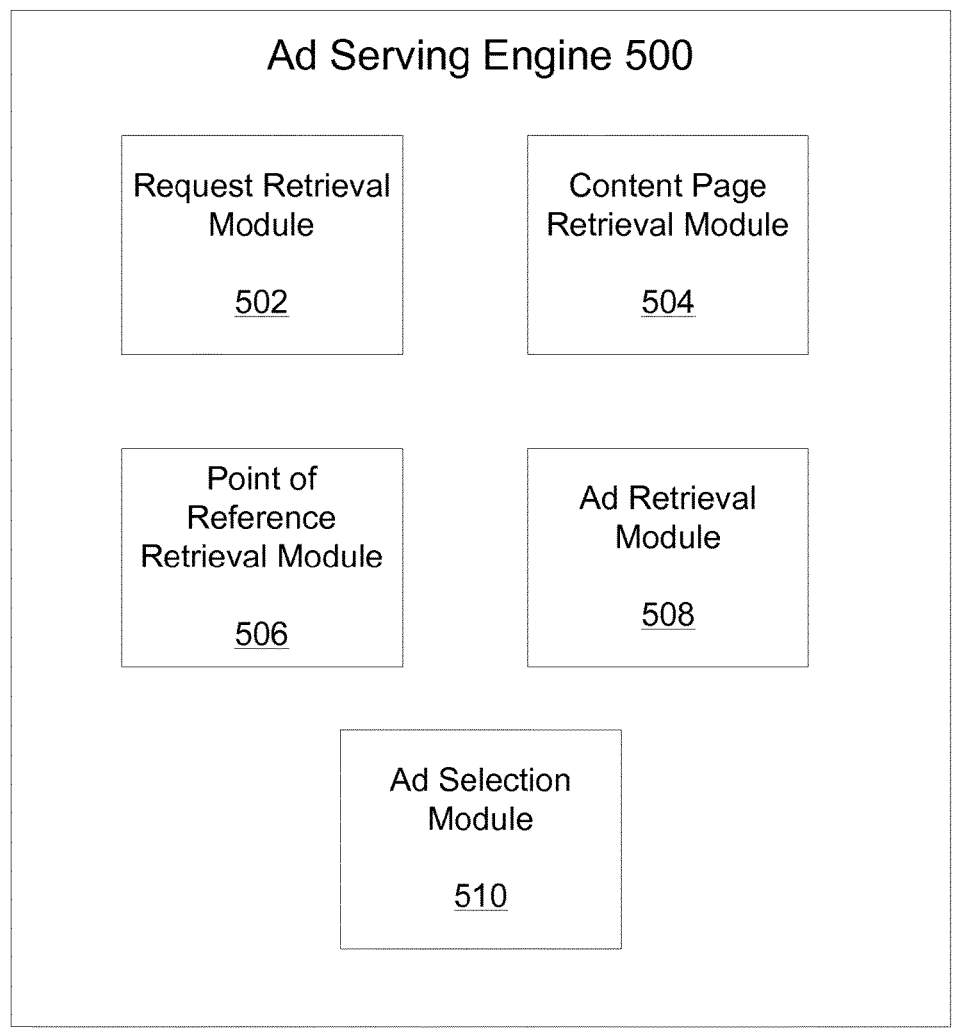
FIG. 5 illustrates one embodiment of an advertising serving engine in accordance with an embodiment of the present disclosure.

FIG. 5 illustrates an embodiment of the ad-serving engine discussed in FIGS. 2-4. In some embodiments, the ad-serving engine 500 could be hosted by the user computing device 110 of FIG. 1. In another embodiment, the ad-serving engine 500 could be hosted by the web server of FIGS. 1 and 3A. In yet another embodiment, the ad-serving engine 500 could be hosted by the advertising server of FIGS. 1 and 3A.

The ad-serving engine 500 comprises a request retrieval module 502, content page retrieval module 504, point of reference retrieval module 506, ad retrieval module 508 and an ad selection module 510. The request retrieval module 502 is configured to receive a user request for a content page. As discussed above, the request can be generated by the user searching for a content page via a web browser. The content page retrieval module 504 is configured to perform a search for the requested content page. The point of reference retrieval module 506 polls a user database for the user's personal points of reference.

The ad retrieval module 508 is configured to receive the collected information relating to the points of reference and the content page. The ad selection module 510 is configured to search for and select at least one advertisement that correlates with the user's personal points of reference. In some embodiments, the ad selection module 510 is also configured to select advertisements based upon specifics defined by the retrieved content page, as discussed above. After the advertisement has been selected by the ad selection module 510, the ad serving engine 500 is configured for facilitating presentation of the selected advertisement with the retrieved content page to the user computing device 110.

Figure 6:
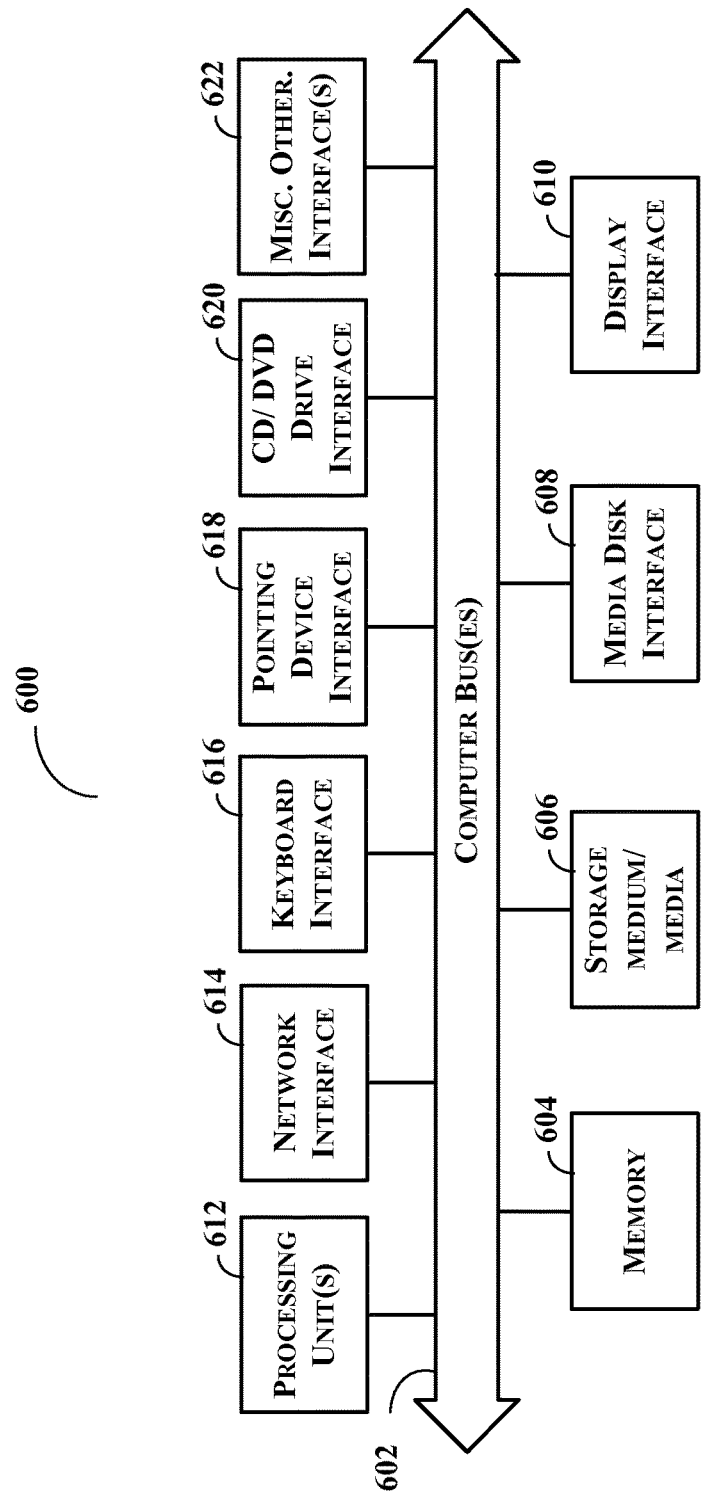
FIG. 6 is a block diagram illustrating an internal architecture of a computing device in accordance with an embodiment of the present disclosure.

FIG. 6 is a block diagram illustrating an internal architecture of an example of a computing device, such as server computers 120 and 130 and/or user computing device 110, in accordance with one or more embodiments of the present disclosure. A computing device as referred to herein refers to any device with a processor capable of executing logic or coded instructions, and could be, as understood in context, a server, personal computer, set top box, smart phone, pad computer or media device, to name a few such devices.

As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "end user" or "user" should be understood to refer to a consumer of data supplied by a data provider. By way of example, and not limitation, the term "user" can refer to a person who receives data provided by the data provider over the Internet in a browser session, or can refer to an automated software application which receives the data and stores or processes the data.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

receiving, at a server computer over a network, a user search request for content;

identifying, via the server computer, said content on the network based upon the user search request;

searching, via the server computer, a user database for a user defined personal point of reference, the user defined personal point of reference comprising partial geo-coded location information associated with a pre-defined user identified location that corresponds to a geographic location identified by the user, said partial geo-coded location information at least identifying an area proximate to the geographic location;

selecting, via the server computer, said personal point of reference;

communicating a search request to an advertisement database to identify an advertisement embodied as a digital media item that contains ad information that is relevant to the selected personal point of reference, said communication causing a search of the advertisement database that involves analyzing metadata of advertisements in said database and, identifying metadata that corresponds to the partial geo-coded location information defined by the selected personal point of reference;

upon identifying said metadata that corresponds to the selected personal point of reference, compiling, via the server computer, a remaining portion of the geo-coded location information, said compiled remaining portion comprising information indicating more specific geo-coded location information related to the geographic location than the partial geo-coded location information;

communicating, via the server computer, a second request to the advertisement database comprising the remaining portion, said communication causing a refined search based on the more specific geo-coded location information, wherein said caused search identifies metadata that corresponds to the more specific geo-coded location information, wherein said identified advertisement has appended therein said identified metadata from the refined search;

receiving, at the server computer from the advertisement database, said identified advertisement; and communicating, via the server computer, said identified advertisement with said content to said user over the network.

2. The method of claim 1, wherein said user database comprises:

a listing comprising a plurality of user defined personal points of reference associated with the user, wherein the listed personal points of reference are organized according to a priority designation that reflects the level of interest the user has for each.

3. The method of claim 2, wherein said selecting said personal point of reference further comprises:

selecting a personal point of reference from said listing, wherein said selected personal point of reference is designated as having top priority in the listing of personal points of reference.

4. The method of claim 3, wherein said selecting the personal point of reference from said listing is based upon a proximity designation set by the user, the proximity designation identifying a radius around the geographic location identified by the selected personal point of reference as part of the geographic location identified by the personal point of reference.

5. The method of claim 1, wherein said search request communication to the advertisement database further comprises:

identifying advertisement metadata stored in the advertisement database that is associated with the advertisement.

6. The method of claim 5, wherein said advertisement metadata comprises:

geographical location data; and data corresponding to attributes of the associated advertisement.

7. The method of claim 6, further comprises:

identifying advertisement metadata that corresponds to a similar location identified by the personal point of reference, wherein the advertisement metadata and the personal point of reference identify the same geographical location; and retrieving the advertisement associated with the advertisement metadata.

8. The method of claim 1, wherein said identified content comprises:

a content page for visible display; and page attributes defined by the content page that dictate the display of the content within the content page.

9. The method of claim 8, wherein said advertisement is fit within the content page based upon the page attributes defined by the content page.

10. The method of claim 9, wherein the content and the advertisement are compiled within a web browser, wherein the web browser facilitates visibly display of the content page and the advertisement, the advertisement display being contingent upon said page attributes.

11. A non-transitory computer-readable storage medium tangibly encoded with computer executable instructions, which when executed by at least one processor of a computing device, perform a method comprising:

receiving, over a network, a user search request for content;

identifying said content on the network based upon the user search request;

searching a user database for a user defined personal point of reference, the user defined personal point of reference comprising partial geo-coded location information associated with a predefined user identified location that corresponds to a geographic location identified by the user, said partial geo-coded location information at least identifying an area proximate to the geographic location;

communicating a search request to an advertisement database to identify an advertisement embodied as a digital media item that contains ad information that is relevant to the selected personal point of reference, said communication causing a search of the advertisement database that involves analyzing metadata of advertisements in said database and, identifying metadata that corresponds to the partial geo-coded location information defined by the selected personal point of reference;

upon identifying said metadata that corresponds to the selected personal point of reference, compiling a remaining portion of the geo-coded location information, said compiled remaining portion comprising information indicating more specific geo-coded location information related to the geographic location than the partial geo-coded location information;

communicating a second request to the advertisement database comprising the remaining portion, said communication causing a refined search based on the more specific geo-coded location information, wherein said caused search identifies metadata that corresponds to the more specific geo-coded location information, wherein said identified advertisement has appended therein said identified metadata;

receiving, from the advertisement database, said identified advertisement; and facilitating serving said identified advertisement with said content to said user over the network.

12. The non-transitory computer-readable storage medium of claim 11, wherein said user database comprises:

a listing comprising a plurality of user defined personal points of reference associated with the user, wherein the listed personal points of reference are organized according to a priority designation that reflects the level of interest the user has for each.

13. The non-transitory computer-readable storage medium of claim 12, wherein said selecting said personal point of reference further comprises:

selecting a personal point of reference from said listing, wherein said selected personal point of reference is designated as having top priority in the listing of personal points of reference, wherein said selecting the personal point of reference from said listing is further based upon a proximity designation set by the user, the proximity designation identifying a radius around the geographic location identified by the selected personal point of reference as part of the geographic location identified by the personal point of reference.

14. The non-transitory computer-readable storage medium of claim 11, wherein said search request to the advertisement database further comprises:
identifying advertisement metadata associated with advertisements stored in the advertisement database, said advertising metadata comprises geographical location data and data corresponding to attributes of the associated advertisement.

15. The non-transitory computer-readable storage medium of claim 14, further comprises:
identifying advertisement metadata that corresponds to a similar location identified by the selected personal point of reference, wherein the advertisement metadata and the personal point of reference identify the same geographical location; and
selecting the advertisement associated with the advertisement metadata that corresponds with the personal point of reference.

16. The non-transitory computer-readable storage medium of claim 11, wherein said identified content comprises:
a content page for visible display; and
page attributes that dictate the display of the content within the content page, wherein said selected advertisement is fit within the content page based upon the page attributes defined by the content page.

17. A server computer comprising:
a processor;
a non-transitory computer-readable storage medium for tangibly storing thereon program logic for execution by the processor, the program logic comprising:
logic executed by the processor for receiving, at t server computer over a network, a user search request for content;
logic executed by the processor for identifying, via the server computer, said content on the network based upon the user search request;
logic executed by the processor for searching, via the server computer, a user database for a user defined personal point of reference, the user defined personal point of reference comprising partial geo-coded location information associated with a predefined user identified that corresponds to a geographic location identified by the user, said partial geo-coded location information at least identifying an area proximate to the geographic location;
logic executed by the processor for selecting, via the server computer, said personal point of reference;
logic executed by the processor for communicating a search request to an advertisement database to identify an advertisement embodied as a digital media item that contains ad information that is relevant to the selected personal point of reference, said communication causing a search of the advertisement database that involves analyzing metadata of advertisements in said database and, identifying metadata that corresponds to the partial geo-coded location information defined by the selected personal point of reference;
logic executed by the processor for, upon identifying said metadata that corresponds to the selected personal point of reference, compiling, via the server, a remaining portion of the geo-coded location information, said compiled remaining portion comprising information indicating more specific geo-coded location information related to the geographic location than the partial geo-coded location information;
logic executed by the processor for communicating, via the server computer, a second request to the advertisement database comprising the remaining portion, said communication causing a refined search based on the more specific geo-coded location information, wherein said caused search identifies metadata that corresponds to the more specific geo-coded location information, wherein said identified advertisement has appended therein said identified metadata from the refined search;
logic executed by the processor for receiving, at the server computer from the advertisement database, said identified advertisement; and
logic executed by the processor for communicating, via the server computer, said identified advertisement with said content to said user over the network.

18. The server computer of claim 17, further comprising:
storage logic executed by the processor for storing geographic location information for each personal point of reference; and
storage logic executed by the processor for storing location data for each personal point of reference, the location data matching with the geographic location information and identifying attributes of the personal point of reference.

19. The server computer of claim 17, further comprising:
storage logic executed by the processor for storing advertisements; and
storage logic executed by the processor for storing advertisement metadata associated with the advertisements stored in the advertisement store, said advertisement metadata comprising information relating to attributes of the associated advertisements and geographic location information.

* * * * *